United States Patent
Wigard et al.

(10) Patent No.: US 12,452,824 B2
(45) Date of Patent: Oct. 21, 2025

(54) POSITIONING TIME GAP SCHEDULING FOR NON-TERRESTRIAL COMMUNICATION

(71) Applicant: Nokia Technologies Oy, Espoo (FI)

(72) Inventors: Jeroen Wigard, Aalborg (DK); Mads Lauridsen, Aalborg (DK); Ryan Keating, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 306 days.

(21) Appl. No.: 18/258,385

(22) PCT Filed: Sep. 14, 2021

(86) PCT No.: PCT/EP2021/075152
§ 371 (c)(1),
(2) Date: Jun. 20, 2023

(87) PCT Pub. No.: WO2022/152412
PCT Pub. Date: Jul. 21, 2022

(65) Prior Publication Data
US 2024/0306115 A1    Sep. 12, 2024

(30) Foreign Application Priority Data
Jan. 14, 2021 (FI) ..................................... 20215041

(51) Int. Cl.
*H04W 64/00* (2009.01)
*H04W 68/00* (2009.01)
*H04W 84/06* (2009.01)

(52) U.S. Cl.
CPC ......... *H04W 64/00* (2013.01); *H04W 68/005* (2013.01); *H04W 84/06* (2013.01)

(58) Field of Classification Search
None
See application file for complete search history.

(56) References Cited

U.S. PATENT DOCUMENTS

| 9,507,025 B2 | 11/2016 | Wang et al. |
| 2005/0277413 A1 | 12/2005 | Kim |

(Continued)

FOREIGN PATENT DOCUMENTS

| EP | 3518003 A1 | 7/2019 |
| WO | 2012/034681 A1 | 3/2012 |

(Continued)

OTHER PUBLICATIONS

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.

(Continued)

*Primary Examiner* — Suhail Khan
(74) *Attorney, Agent, or Firm* — Barta Jones, PLLC

(57) ABSTRACT

Various example embodiments relate to provision of a positioning time gap in a paging procedure. An apparatus may obtain positioning capability information of a device. The positioning capability information may comprise an indication of a first time period for determining a position of the device with first initial positioning data and an indication of a second time period for determining the position of the device with second initial positioning data. A positioning time gap may be determined based on the positioning capability information of the device. The apparatus may transmit a first signal, but refrain from transmitting a second signal for at least a duration of the positioning time gap from the first signal. Apparatuses, methods, and computer programs are disclosed.

4 Claims, 5 Drawing Sheets

(56) References Cited

U.S. PATENT DOCUMENTS

| | | | |
|---|---|---|---|
| 2012/0164970 A1 | 6/2012 | Fomukong et al. | |
| 2013/0317944 A1* | 11/2013 | Huang | G01S 5/02521 |
| | | | 455/457 |
| 2018/0143325 A1 | 5/2018 | Park et al. | |
| 2019/0320493 A1 | 10/2019 | Ang et al. | |
| 2019/0342833 A1 | 11/2019 | Astrom et al. | |
| 2019/0349853 A1 | 11/2019 | Singh et al. | |
| 2020/0169956 A1 | 5/2020 | Sun et al. | |
| 2020/0322891 A1 | 10/2020 | Ostman et al. | |

FOREIGN PATENT DOCUMENTS

| | | | |
|---|---|---|---|
| WO | 2019/063819 A1 | 4/2019 | |
| WO | 2019/086309 A1 | 5/2019 | |
| WO | 2020/201885 A1 | 10/2020 | |

OTHER PUBLICATIONS

"3rd Generation Partnership Project; Technical Specification Group Radio Access Network; NR; User Equipment (UE) procedures in Idle mode and RRC Inactive state (Release 16)", 3GPP TS 38.304, V16.2.0, Sep. 2020, pp. 1-39.

"Solutions for NR to support non-terrestrial networks (NTN)", 3GPP TSG RAN meeting #86, RP-193234, Agenda: 9.1.2, Thales, Dec. 9-13, 2019, 10 pages.

"3rd Generation Partnership Project; Technical Specification Group Radio Access Network; Solutions for NR to support non-terrestrial networks (NTN) (Release 16)", 3GPP TR 38.821, V16.0.0, Dec. 2019, pp. 1-40.

"New Study WID on NB-IoT/eTMC support for NTN", 3GPP TSG RAN Meeting #86, RP-193235, Agenda: xxx, MediaTek Inc, Dec. 9-31, 2019, 4 pages.

"Discussion on power consumption and NPRACH capacity for NTN", 3GPP TSG RAN WG1 #103-e, R1-2008856, Agenda: 8.15.3, ZTE, Oct. 26-Nov. 13, 2020, 6 pages.

"3rd Generation Partnership Project; Technical Specification Group Radio Access Network; Evolved Universal Terrestrial Radio Access (E-UTRA); User Equipment (UE) procedures in idle mode (Release 16)", 3GPP TS 36.304, V16.2.0, Sep. 2020, pp. 1-64.

Stern et al., "Positioning Performance Assessment of Geodetic, Automotive, and Smartphone GNSS Receivers in Standardized Road Scenarios", IEEE Access, vol. 6, Jul. 26, 2018, pp. 41410-41428.

Tawalbeh et al., "Greener and Smarter Phones for Future Cities: Characterizing the Impact of GPS Signal Strength on Power Consumption", IEEE Access, vol. 4, Feb. 19, 2016, pp. 1-13.

"LTE; Evolved Universal Terrestrial Radio Access (E-UTRA); Requirements for Support of Assisted Global Navigation Satellite System (A-GNSS) (3GPP TS 36.171 version 9.1.0 Release 9)", ETSI TS 136 171, V9.1.0, Jul. 2010, 40 pages.

"IEEE 802.11", Wikipedia, Retrieved on Jul. 4, 2023, Webpage available at : https://en.wikipedia.org/wiki/IEEE_802.11.

Office action received for corresponding Finnish Patent Application No. 20215041, dated Jun. 16, 2021, 7 pages.

International Search Report and Written Opinion received for corresponding Patent Cooperation Treaty Application No. PCT/EP2021/075152, dated Jan. 4, 2022, 27 pages.

"Updated feature lead summary of Wake-up signal configurations and procedures in NB-IoT", 3GPP TSG RAN WG1 Meeting #93, R1-1807560, Agenda: 6.2.7.1.1.2, Huawei, May 21-25, 2018, 19 pages.

* cited by examiner

POSITIONING TIME GAP SCHEDULING FOR NON-TERRESTRIAL COMMUNICATION

RELATED APPLICATION

This application claims priority to PCT Application No. PCT/EP2021/075152, filed on Sep. 14, 2021, which claims priority from FI application No. 20215041, filed on Jan. 14, 2021, each of which is incorporated herein by reference in its entirety.

TECHNICAL FIELD

Various example embodiments generally relate to the field of wireless communications. In particular, some example embodiments relate to scheduling a time gap for positioning in non-terrestrial communication.

BACKGROUND

Various wireless communication systems, for example 3GPP 5G new radio (NR), may provide non-terrestrial network support for example by including base stations in satellites or by relaying signals via satellites. A device such as for example a user equipment (UE) may be provided with positioning capability, for example by means of an integrated global navigation satellite system (GNSS) device.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments enable reduction of unnecessary signaling and power consumption of a paging procedure. Further implementation forms are provided in the dependent claims, the description, and the drawings.

According to a first aspect, an apparatus may comprise means for means for obtaining positioning capability information of a device, wherein the positioning capability information comprises an indication of a first time period for determining a position of the device with first initial positioning data and an indication of a second time period for determining the position of the device with second initial positioning data; means for determining a positioning time gap based on the positioning capability information of the device; means for transmitting a first signal to the device; and means for refraining from transmitting a second signal to the device for at least a duration of the positioning time gap from the first signal.

According to an example embodiment of the first aspect, the apparatus may further comprise means for receiving the positioning capability information from the device.

According to an example embodiment of the first aspect, the first signal may comprise a paging message and the second signal may comprise a second paging message.

According to an example embodiment of the first aspect, the apparatus may further comprise means for determining at least one paging occasion for indicating the second paging message based on the positioning time gap.

According to an example embodiment of the first aspect, the apparatus may further comprise means for transmitting a wake-up signal prior to transmission of the paging message.

According to an example embodiment of the first aspect, the first signal may comprise a wake-up signal and the second signal may comprise a paging message.

According to an example embodiment of the first aspect, the apparatus may further comprise means for determining at least one paging occasion for indicating the paging message based on the positioning time gap.

According to an example embodiment of the first aspect, the apparatus may further comprise means for determining not to transmit the second signal, in response to receiving a random access signal from the device.

According to an example embodiment of the first aspect, the apparatus may further comprise means for determining the positioning time gap based on the first time period or the second time period.

According to an example embodiment of the first aspect, the first initial positioning data may comprise at least almanac data of a plurality of satellites and not ephemeris data. The second initial positioning data may comprise at least the almanac data of the plurality of satellites and the ephemeris data of at least one of the plurality of satellites.

According to an example embodiment of the first aspect, the apparatus may further comprise means for determining to use the first time period as basis for determining the positioning time gap, if a previous location update of the device has been received within an update interval of the almanac data and not within an update interval of the ephemeris data; or means for determining to use the second time period as basis for determining the positioning time gap, if the previous location update of the device has been received within the update interval of the ephemeris data.

According to an example embodiment of the first aspect, the apparatus may further comprise means for scaling the positioning time gap by a scaling factor associated with a previous location of the device; and means for transmitting an indication of the scaling factor to the device.

According to an example embodiment of the first aspect, the apparatus may further comprise means for determining that the device is expected to perform cell reselection to another cell before an intended transmission time of the second paging message; and means for adjusting the positioning time gap based on a cell reselection time.

According to an example embodiment of the first aspect, the wake-up signal may comprise at least one of: a flag indicative of use of the positioning time gap, an indication of the duration of the positioning time gap, or an indication of use of the first time period or the second time period as the positioning time gap.

According to an example embodiment of the first aspect, the apparatus may further comprise means for transmitting the second signal in a plurality of consecutive paging occasions occurring after the duration of the positioning time gap from the transmission of the first signal.

According to an example embodiment of the first aspect, the apparatus may further comprise means for refraining from transmitting further paging messages, in response to receiving a random access signal from the device.

According to a second aspect, a method may comprise obtaining positioning capability information of a device, wherein the positioning capability information comprises an indication of a first time period for determining a position of the device with first initial positioning data and an indication of a second time period for determining the position of the device with second initial positioning data; determining a positioning time gap based on the positioning capability information of the device; transmitting a first signal to the device; and refraining from transmitting a second signal to the device for at least a duration of the positioning time gap from the first signal.

According to an example embodiment of the second aspect, the method may further comprise receiving the positioning capability information from the device.

According to an example embodiment of the second aspect, the first signal may comprise a paging message and the second signal may comprise a second paging message.

According to an example embodiment of the second aspect, the apparatus may further comprise means for determining at least one paging occasion for indicating the second paging message based on the positioning time gap.

According to an example embodiment of the second aspect, the method may further comprise transmitting a wake-up signal prior to transmission of the paging message.

According to an example embodiment of the second aspect, the first signal may comprise a wake-up signal and the second signal may comprise a paging message.

According to an example embodiment of the second aspect, the method may further comprise determining at least one paging occasion for indicating the paging message based on the positioning time gap.

According to an example embodiment of the second aspect, the method may further comprise determining not to transmit the second signal, in response to receiving a random access signal from the device.

According to an example embodiment of the second aspect, the method may further comprise determining the positioning time gap based on the first time period or the second time period.

According to an example embodiment of the second aspect, the first initial positioning data may comprise at least almanac data of a plurality of satellites and not ephemeris data. The second initial positioning data may comprise at least the almanac data of the plurality of satellites and the ephemeris data of at least one of the plurality of satellites.

According to an example embodiment of the second aspect, the method may further comprise determining to use the first time period as basis for determining the positioning time gap, if a previous location update of the device has been received within an update interval of the almanac data and not within an update interval of the ephemeris data; or determining to use the second time period as basis for determining the positioning time gap, if the previous location update of the device has been received within the update interval of the ephemeris data.

According to an example embodiment of the second aspect, the method may further comprise scaling the positioning time gap by a scaling factor associated with a previous location of the device; and transmitting an indication of the scaling factor to the device.

According to an example embodiment of the second aspect, the method may further comprise determining that the device is expected to perform cell reselection to another cell before an intended transmission time of the second paging message; and adjusting the positioning time gap based on a cell reselection time.

According to an example embodiment of the second aspect, the wake-up signal may comprise at least one of: a flag indicative of use of the positioning time gap, an indication of the duration of the positioning time gap, or an indication of use of the first time period or the second time period as the positioning time gap.

According to an example embodiment of the second aspect, the method may further comprise transmitting the second signal in a plurality of consecutive paging occasions occurring after the duration of the positioning time gap from the transmission of the first signal.

According to an example embodiment of the second aspect, the method may further comprise refraining from transmitting further paging messages, in response to receiving a random access signal from the device.

According to a third aspect, a computer program may comprise instructions for causing an apparatus to perform at least the following: obtaining positioning capability information of a device, wherein the positioning capability information comprises an indication of a first time period for determining a position of the device with first initial positioning data and an indication of a second time period for determining the position of the device with second initial positioning data; determining a positioning time gap based on the positioning capability information of the device; transmitting a first signal to the device; and refraining from transmitting a second signal to the device for at least a duration of the positioning time gap from the first signal. The computer program may further comprise instructions for causing the apparatus to perform any example embodiment of the method of the second aspect.

According to a fourth aspect, an apparatus may comprise at least one processor and at least one memory including computer program code, the at least one memory and the computer code configured to, with the at least one processor, cause the apparatus at least to: obtain positioning capability information of a device, wherein the positioning capability information comprises an indication of a first time period for determining a position of the device with first initial positioning data and an indication of a second time period for determining the position of the device with second initial positioning data; determine a positioning time gap based on the positioning capability information of the device; transmit a first signal to the device; and refrain from transmitting a second signal to the device for at least a duration of the positioning time gap from the first signal. The at least one memory and the computer code may be further configured to, with the at least one processor, cause the apparatus to perform any example embodiment of the method of the second aspect.

According to a fifth aspect, an apparatus may comprise means for receiving, from a network node, a first signal; means for activating a positioning device of the apparatus and determining a position of the apparatus, in response to receiving the first signal; means for determining not to monitor paging occasions for a duration of a positioning time gap from reception of the first signal, wherein the positioning time gap is based on positioning capability information of the apparatus comprising an indication of a first time period for determining a position of the apparatus with first initial positioning data and an indication of a second time period for determining the position of the apparatus with second initial positioning data; and means for transmitting a random access signal to the network node, in response to determining the position of the apparatus or in response to receiving a second signal after the positioning time gap from reception of the first signal.

According to an example embodiment of the fifth aspect, the apparatus may further comprise means for transmitting the positioning capability information to the network node.

According to an example embodiment of the fifth aspect, the first signal may comprise a paging message and the second signal may comprise a second paging message.

According to an example embodiment of the fifth aspect, the apparatus may further comprise means for receiving a wake-up signal prior to reception of the paging message.

According to an example embodiment of the fifth aspect, the first signal may comprise a wake-up signal and the second signal may comprise a paging message.

According to an example embodiment of the fifth aspect, the apparatus may further comprise means for monitoring at least one paging occasion occurring after the positioning time gap; and means for receiving the paging message at the at least one paging occasion after the positioning time gap.

According to an example embodiment of the fifth aspect, the apparatus may further comprise means for receiving a scaling factor for the positioning time gap, wherein the scaling factor is associated with a previous location of the apparatus; means for scaling the positioning gap time with the scaling factor; and means for monitoring the at least one paging occasion occurring after the scaled positioning time gap for reception of the paging message.

According to an example embodiment of the fifth aspect, the first initial positioning data may comprise at least almanac data of a plurality of satellites and not ephemeris data. The second initial positioning data may comprise at least the almanac data of the plurality of satellites and the ephemeris data of at least one of the plurality of satellites.

According to an example embodiment of the fifth aspect, the wake-up signal may comprise at least one of: a flag indicative of use of the positioning time gap, an indication of the positioning time gap, or an indication of use of the first time period or the second time period as the positioning time gap.

According to a sixth aspect, a method may comprise: receiving, from a network node, a first signal; activating a positioning device of the apparatus and determining a position of the apparatus, in response to receiving the first signal; determining not to monitor paging occasions for a duration of a positioning time gap from reception of the first signal, wherein the positioning time gap is based on positioning capability information of the apparatus comprising an indication of a first time period for determining a position of the apparatus with first initial positioning data and an indication of a second time period for determining the position of the apparatus with second initial positioning data; and transmitting a random access signal to the network node, in response to determining the position of the apparatus or in response to receiving a second signal after the positioning time gap from reception of the first signal.

According to an example embodiment of the sixth aspect, the method may further comprise transmitting the positioning capability information to the network node.

According to an example embodiment of the sixth aspect, the first signal may comprise a paging message and the second signal may comprise a second paging message.

According to an example embodiment of the sixth aspect, the method may further comprise receiving a wake-up signal prior to reception of the paging message.

According to an example embodiment of the sixth aspect, the first signal may comprise a wake-up signal and the second signal may comprise a paging message.

According to an example embodiment of the sixth aspect, the method may further comprise monitoring at least one paging occasion occurring after the positioning time gap; and receiving the paging message at the at least one paging occasion after the positioning time gap.

According to an example embodiment of the sixth aspect, the method may further comprise receiving a scaling factor for the positioning time gap, wherein the scaling factor is associated with a previous location of the apparatus; scaling the positioning gap time with the scaling factor; and monitoring the at least one paging occasion occurring after the scaled positioning time gap for reception of the paging message.

According to an example embodiment of the sixth aspect, the first initial positioning data may comprise at least almanac data of a plurality of satellites and not ephemeris data. The second initial positioning data may comprise at least the almanac data of the plurality of satellites and the ephemeris data of at least one of the plurality of satellites.

According to an example embodiment of the sixth aspect, the wake-up signal may comprise at least one of: a flag indicative of use of the positioning time gap, an indication of the positioning time gap, or an indication of use of the first time period or the second time period as the positioning time gap.

According to a seventh aspect, a computer program may comprise instructions for causing an apparatus to perform at least the following: receiving, from a network node, a first signal; activating a positioning device of the apparatus and determining a position of the apparatus, in response to receiving the first signal; determining not to monitor paging occasions for a duration of a positioning time gap from reception of the first signal, wherein the positioning time gap is based on positioning capability information of the apparatus comprising an indication of a first time period for determining a position of the apparatus with first initial positioning data and an indication of a second time period for determining the position of the apparatus with second initial positioning data; and transmitting a random access signal to the network node, in response to determining the position of the apparatus or in response to receiving a second signal after the positioning time gap from reception of the first signal. The computer program may further comprise instructions for causing the apparatus to perform any example embodiment of the method of the sixth aspect.

According to an eighth aspect, an apparatus may comprise at least one processor and at least one memory including computer program code, the at least one memory and the computer code configured to, with the at least one processor, cause the apparatus at least to: receive, from a network node, a first signal; activate a positioning device of the apparatus and determine a position of the apparatus, in response to receiving the first signal; determine not to monitor paging occasions for a duration of a positioning time gap from reception of the first signal, wherein the positioning time gap is based on positioning capability information of the apparatus comprising an indication of a first time period for determining a position of the apparatus with first initial positioning data and an indication of a second time period for determining the position of the apparatus with second initial positioning data; and transmit a random access signal to the network node, in response to determining the position of the apparatus or in response to receiving a second signal after the positioning time gap from reception of the first signal. The at least one memory and the computer code may be further configured to, with the at least one processor, cause the apparatus to perform any example embodiment of the method of the sixth aspect.

Any example embodiment may be combined with one or more other example embodiments. Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings.

Like references are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Devices, such as for example user equipment (UE), may be enabled to access services through a terrestrial network (TN). In addition, devices may be enabled to access services over a non-terrestrial network (NTN) provided by satellites. For example, terrestrial cellular networks, such as for example networks based on 5G NR standards, may be configured to support non-terrestrial networks. UEs supporting NTN may have positioning capability, for example by means of GNSS. In one example of an NTN system, 5G base stations (gNB) may be deployed onboard satellites, or the gNB signals may be relayed via the satellite(s), to provide communication coverage over a very large area that may be otherwise unreachable by cellular networks. Non-terrestrial networks may be for example used to connect internet-of-things (IoT) devices globally as well as to provide personal communication in remote areas and in disaster relief.

Figure 1:
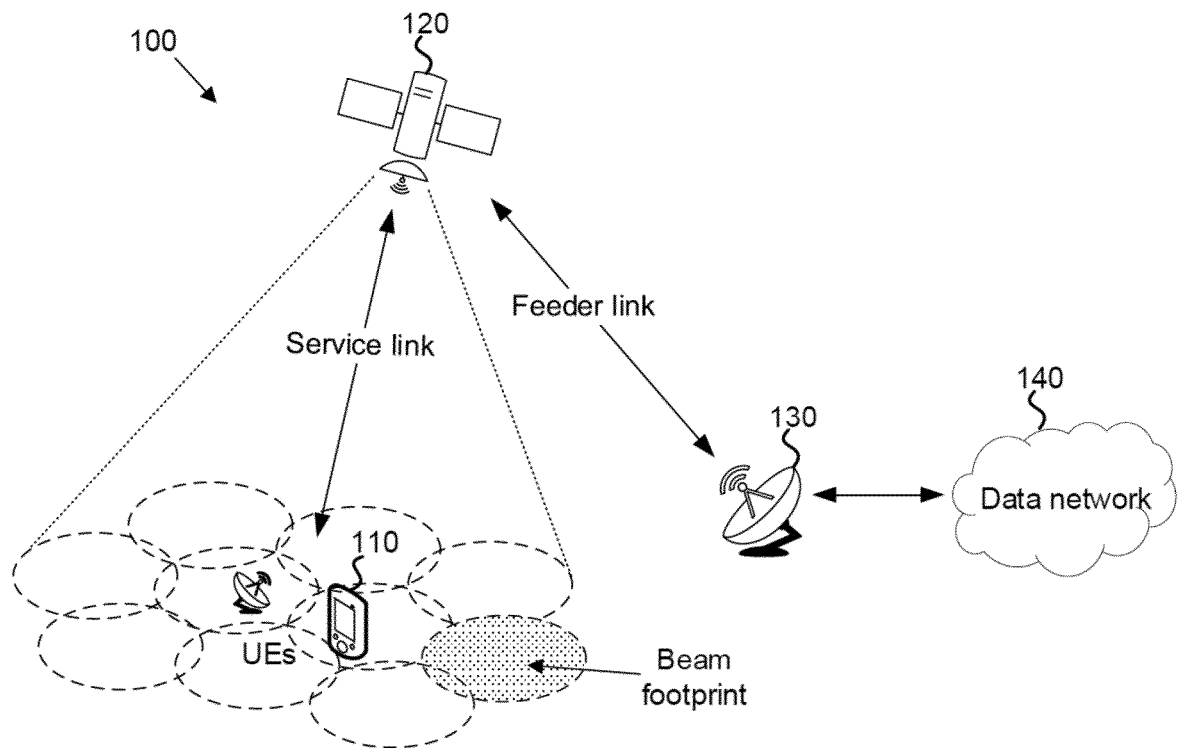
FIG. 1 illustrates an example of a non-terrestrial communication network, according to an example embodiment.

FIG. 1 illustrates an example of a non-terrestrial communication network, according to an example embodiment. The non-terrestrial communication network 100 may comprise one or more UEs 110. A service link may be provided between the UE 110 and a satellite 120, which may be further connected to a gateway 130 by a feeder link. The gateway 130 may be connected to a data network 140 to enable the UE 110 to access data services.

Satellite 120 may be located on a satellite orbit such as for example a low earth orbit (LEO), which may be located approximately 600 km above the earth. Satellite 120 may therefore comprise a LEO satellite. Other types of satellites may be however applied as well, including for example geostationary satellites with a higher orbit. However, with LEO satellites the communication delay may be shorter and cost of a LEO satellite and its deployment may be lower compared to other type of satellites. A beam footprint size of a LEO satellite may be for example between 100-1000 km in radius. One LEO satellite may therefore cover a very large area on the earth, including possibly multiple countries.

Technologies such as Narrowband Internet-of-Things (NB-IoT), Long Term Evolution-Machine type communication (LTE-M), and enhanced Machine Type Communication (eMTC) as specified by the $3^{rd}$ generation partnership project (3GPP) enable low power communication over cellular communication networks. When implementing NB-IoT or eMTC over NTN, the UE 110 may be equipped with GNSS, or some other positioning system. GNSS may be used for example to compensate for random access channel (RACH) timing, for example initial RACH timing, and/or frequency misalignment due to the fast movement of the satellites (e.g. 7.5 km/s). This may result in situations where a UE 110 may be able to access the network only if it knows its own location. At the same time, especially for IoT devices, it may be desired to reduce power consumption, which means that the system may be optimized by taking into account the power consumption of GNSS at the UE 110. Even though 3GPP 5G NR and GNSS are used as examples of a communication network and positioning system, it is appreciated that the example embodiments described herein may be applied to any suitable communication and positioning system.

The amount of energy needed for acquiring a position depends at least on how long ago the needed information has been acquired and can be categorized depending on the UE's starting state, for example in terms of whether the UE 110 has almanac and/or ephemeris data available. The almanac data may describe orbital courses of satellites. Every satellite may broadcast almanac data for each satellite. Almanac data may include parameters for each satellite to enable the UE 110 to determine locations of the satellites in the orbit. The almanac data may therefore comprise rough satellite position information for all or a plurality of satellites. The almanac data may be transmitted with a first time interval between consecutive transmissions, for example approximately every 12.5 minutes. Therefore it may take a long time, for example 12.5 minutes, for UE 110 to receive the almanac data. The ephemeris data may comprise more accurate information for a single satellite. The ephemeris data may be transmitted at a second (shorter) time interval between consecutive transmissions. For example, the ephemeris data may be updated approximately every 30 s. The almanac data may be valid for example for months, while validity of the ephemeris data may be for example in the order of a few hours. The update interval of the almanac data may be therefore longer than the update interval of the ephemeris data.

In GNSS, or in general in any positioning system, the UE 110 may start positioning for example from one of the following states:

Cold start: The UE 110 does not have almanac or ephemeris data available. Given the long almanac periodicity, it may take for example 15 minutes to obtain a valid position estimate at the UE 110.

Warm start: The UE 110 has almanac data, but not ephemeris data. The GNSS radio of the UE 110 may be capable of receiving signals from multiple satellites simultaneously and the average time to obtain a valid position estimate may be for example 30 s.

Hot start: The UE 110 has up-to-date almanac and ephemeris data, which may enable the UE 110 to acquire a valid position estimate for example in approximately 1 s.

Other example of positioning systems include observed time difference of arrival (OTDOA), for example using LTE, downlink time difference of arrival (DL-TDOA), for example using 5G NR, or camera based positioning.

In some positioning chipsets, the warm start delay may be for example 28-33 s and the hot start delay may be 1.0-1.1 s. Power consumption of positioning chipsets may range for example from 6 to 22.5 mW. IoT devices may be active for example every 15 minutes, every couple of hours, once a day, or the like to mention a few examples. Communication activity may be UE originated or a device may be requested to send an update once in a while (this update interval may be hours, minutes, days, or the like). Activity of the cellular modem (e.g. 3GPP modem such as 5G NR modem) may be rather limited, and thus running the GNSS device continuously may not be optimal from overall power consumption point of view.

In general, usage of GNSS device at the UE 110 may be implementation specific since the GNSS is a non-cellular radio generally independent of 3GPP. However, in the NTN scenarios (both the IoT and NR cases) the UE 110 may use its GNSS device to assist the communication by the 3GPP radio, for example by precompensation before attempting initial RACH access. The location of the UE 110, obtained for example via GNSS, may be also used for country identification when the UE 110 selects a public land mobile network (PLMN). One solution is to keep the GNSS device running continuously, or at least with very frequent sampling, to maintain an accurate location estimate. However, this may impact overall battery life of the UE 110, and therefore GNSS and 3GPP modems may be configured not to be active simultaneously. Therefore, coordination between the 3GPP modem and the GNSS counterpart may be exploited to optimize power consumption.

A cellular communication signal may be arranged in radio frames. The radio frame in which the UE 110 is configured to wake up for receiving paging messages may be called paging frame (PF). A paging frame may comprise multiple subframes and the UE 110 may be configured to receive only specific subframe(s) within the paging frame. Such subframe(s) may be referred to as paging occasion(s) (PO). A paging occasion may contain a paging downlink control information (DCI), which may be sent for example via a physical downlink control channel (PDCCH). The paging DCI may provide a resource configuration for the paging message, which may be carried on the subsequent PDSCH.

A wake-up signal (WUS) may be used to make paging monitoring more energy efficient, for example in NB-IoT or eMTC. The WUS may comprise a physical signal, which may be for example based on a complex-valued symbol sequence, such as for example a Zadoff-Chu sequence. Alternatively, any other type of wake-up signal such as for example a binary wake-up sequence may be used. In general, a wake-up signal may be received with lower power consumption compared to other signals or messages of the system, for example paging messages. The wake-up signal may for example have a narrower bandwidth compared to paging message(s). The WUS may be for example configured according to 3GPP specifications.

The WUS may be cell-specific and/or identify a specific group of UEs. If at least one UE within the group (or cell) is to be paged in the next paging occasion, the network may send the WUS. When the UEs receive the WUS they may initiate monitoring for the paging downlink control information (DCI) in the corresponding paging occasion. If the UEs do not receive the WUS, they may skip the paging monitoring until the next cycle.

If extended DRX (discontinuous reception) is used, the network may configure multiple paging occasions, which indicates a number (numPO>1) of consecutive paging occasions, which the UE 110 is configured to monitor after receiving a single WUS (one-to-many mapping). The WUS configuration may also include a time-offset, for example measured in subframes, between the end of the WUS and the start of the paging occasion (first PO if multiple POs are configured). The time-offset may be for example partially based on parameter wakeUpSignalMinGap-eDRX (e.g. 40 ms, 240 ms, 1000 ms, or 2000 ms) reported by the UE 110, which indicates the UE capabilities in terms of time gap between WUS and the paging occasion.

A GNSS capable UE may however be configured with cold, warm, and/or hot start implementation specific delays, as opposed to a single delay parameter such as the wakeUpSignalMinGap-eDRX. In addition, the delays may be different at different locations. Therefore, energy efficiency of the paging procedure may be improved if the NTN gNB does not need to rely on a single delay or offset value to take into account the use of GNSS in the UE 110.

Furthermore, a paging early indication (PEI) may be applied in the paging process. A paging early indication may comprise the network sending a WUS-type signal prior to the UE's paging occasion to indicate whether the UE 110 shall monitor the paging occasion or not. The PEI may include sub-grouping functionality, which allows the network to address a sub-group of UEs, which share a certain paging occasion. A paging early indication may be considered as a specific type of a wake-up signal and the example embodiments of the present disclosure may be therefore applied also to such paging early signals, for example when the example embodiments are applied to the 5G NR system.

The example embodiments of the present disclosure enable minimizing power consumption due to GNSS usage, while considering that GNSS may be needed to access the network in some applications. For example, a time gap (time period) may be arranged in order to measure GNSS and properly access the network via a non-terrestrial network. The example embodiments may be applied for example in context of a downlink originated session(s) for NTN networks.

According to an example embodiment, an apparatus may obtain positioning capability information of a device. The positioning capability information may comprise an indication of a first time period for determining a position of the device with first initial positioning data and an indication of a second time period for determining the position of the device with second initial positioning data. A positioning time gap may be determined based on the positioning capability information of the device. The apparatus may transmit a first signal, but refrain from transmitting a second signal for at least a duration of the positioning time gap from the first signal. This enables to avoid unnecessary transmissions of signals, for example paging messages, during the positioning time gap when the device may be unreachable.

Figure 2:
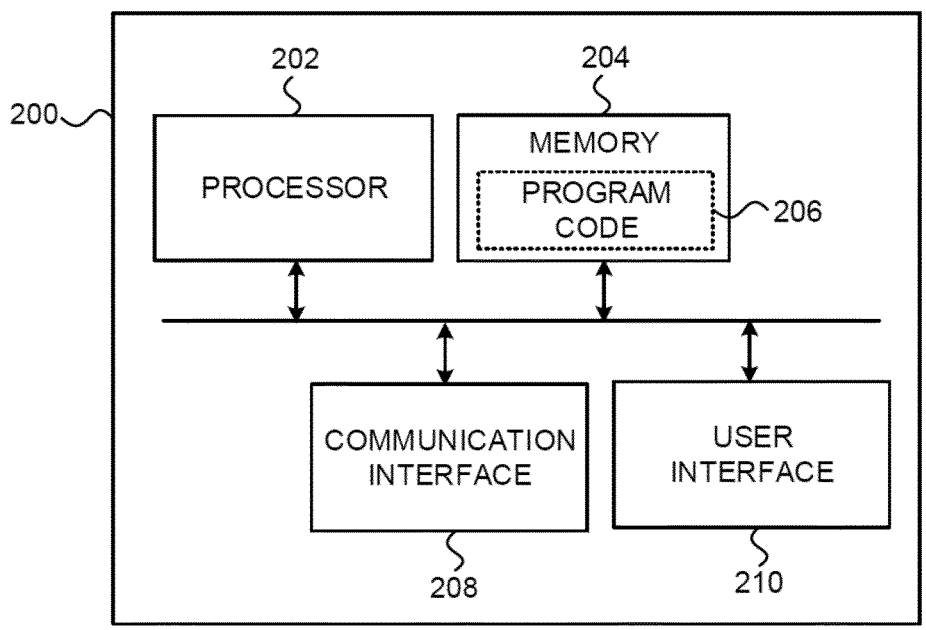
FIG. 2 illustrates an example of an apparatus configured to practice one or more example embodiments.

FIG. 2 illustrates an example embodiment of an apparatus 200, for example UE 110, satellite 120, or a component or a chipset of the UE 110 or satellite 120, or a base station. The apparatus 200 may comprise at least one processor 202. The at least one processor 202 may comprise, for example, one or more of various processing devices or processor circuitry, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The apparatus 200 may further comprise at least one memory 204. The at least one memory 204 may be configured to store, for example, computer program code or the like, for example operating system software and application software. The at least one memory 204 may comprise one or more volatile memory devices, one or more non-volatile memory devices, and/or a combination thereof. For example, the at least one memory 204 may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

The apparatus 200 may further comprise a communication interface 208 configured to enable apparatus 200 to transmit and/or receive information to/from other devices. In one example, apparatus 200 may use communication interface 208 to transmit or receive signaling information and data in accordance with at least one cellular communication protocol. The communication interface may be configured to provide at least one wireless radio connection, such as for example a 3GPP mobile broadband connection (e.g. 3G, 4G, 5G). However, the communication interface may be configured to provide one or more other type of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a wired connection such as for example a local area network (LAN) connection, a universal serial bus (USB) connection or an optical network connection, or the like; or a wired Internet connection. The communication interface 208 may comprise, or be configured to be coupled to, at least one antenna to transmit and/or receive radio frequency signals. One or more of the various types of connections may be also implemented as separate communication interfaces, which may be coupled or configured to be coupled to one or more of a plurality of antennas.

The apparatus 200 may further comprise a user interface 210 comprising an input device and/or an output device. The input device may take various forms such a keyboard, a touch screen, or one or more embedded control buttons. The output device may for example comprise a display, a speaker, a vibration motor, or the like.

When the apparatus 200 is configured to implement some functionality, some component and/or components of the apparatus 200, such as for example the at least one processor 202 and/or the at least one memory 204, may be configured to implement this functionality. Furthermore, when the at least one processor 202 is configured to implement some functionality, this functionality may be implemented using the program code 206 comprised, for example, in the at least one memory 204.

The functionality described herein may be performed, at least in part, by one or more computer program product components such as software components. According to an embodiment, the apparatus comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (GPUs).

The apparatus 200 comprises means for performing at least one method described herein. In one example, the means comprises the at least one processor 202, the at least one memory 204 including program code 206 configured to, when executed by the at least one processor, cause the apparatus 200 to perform the method.

The apparatus 200 may comprise for example a computing device such as for example a base station, a server, a mobile phone, a tablet computer, a laptop, an internet of things (IoT) device, or the like. Examples of IoT devices include, but are not limited to, consumer electronics, wearables, sensors, and smart home appliances. In one example, the apparatus 200 may comprise a vehicle such as for example a car. Although apparatus 200 is illustrated as a single device it is appreciated that, wherever applicable, functions of the apparatus 200 may be distributed to a plurality of devices, for example to implement example embodiments as a cloud computing service.

Figure 3:
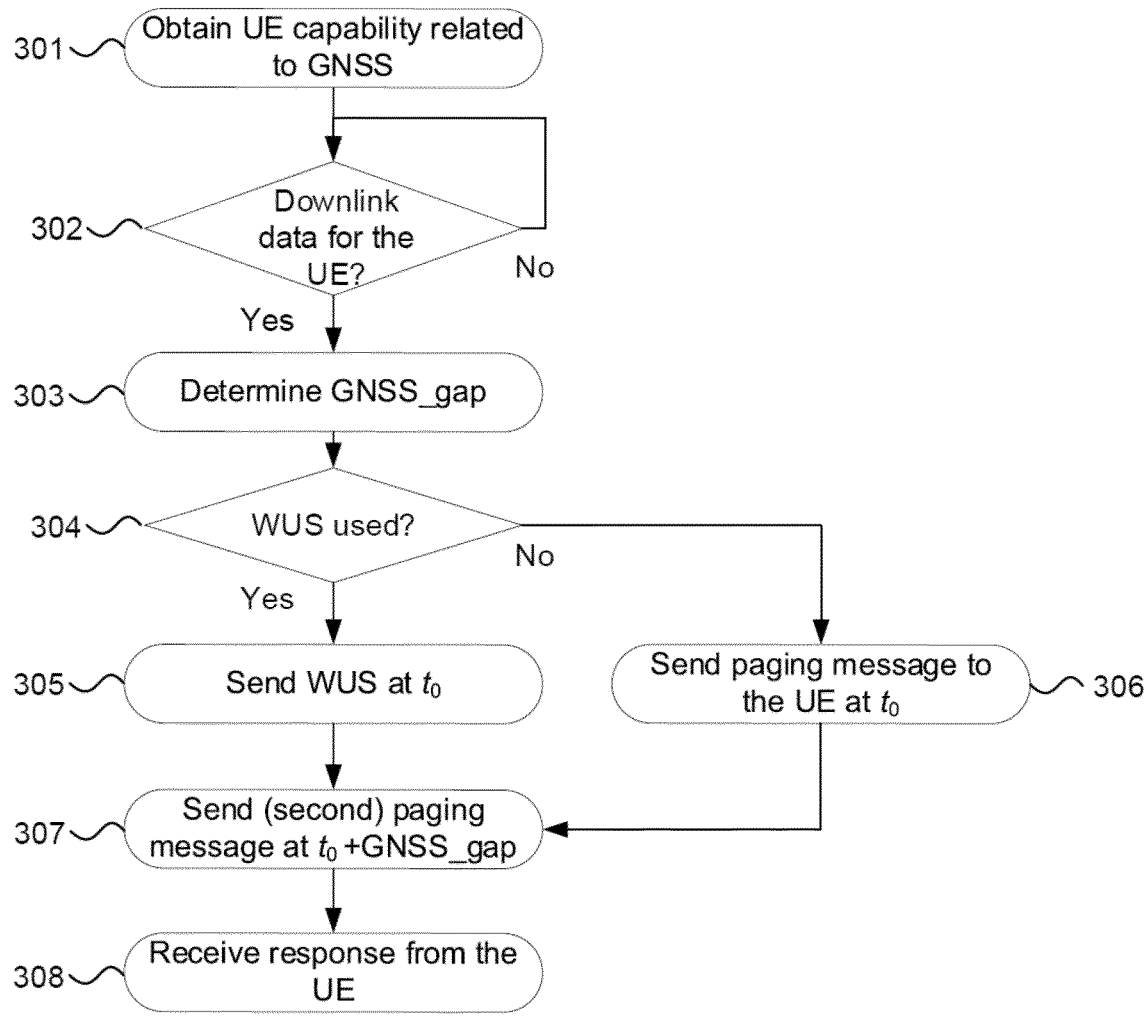
FIG. 3 illustrates an example of a network side flow chart for determining, configuring, and applying a GNSS gap for a UE, according to an example embodiment.

FIG. 3 illustrates an example of a network side flow chart for determining, configuring, and applying a GNSS gap for a UE, according to an example embodiment. The procedure of FIG. 3 may be applied at a network node, for example a base station. Even though example embodiments have been described in context of GNSS, it is noted that the example embodiments may be applied to any suitable positioning system. An example of a GNSS system is the global positioning system (GPS).

At operation 301, the network node may obtain UE capability information related to GNSS. For example, the UE 110 may transmit a UE capability report to the network node or the network may retrieve the UE capability information from a memory of the network node or an external device. The report may comprise positioning capability information of the UE 110. The positioning capability information may include information about time periods for determining position of the UE 110 in various conditions associated with different types of available initial positioning data.

As discussed above, the UE 110 may perform positioning for example in cold, warm, or hot start states. In the cold start state, the available initial positioning data may comprise neither almanac nor ephemeris data. In the warm start state, the available initial positioning data may comprise almanac data, but no ephemeris data. In the hot start state, the available initial positioning data may comprise both almanac and ephemeris data. In general, any two of the different start states may be referred to as start states associated with first initial positioning data and second initial positioning data. For example, the first initial positioning data may comprise the almanac data but no ephemeris data (warm start). The second initial positioning data comprises the almanac data and the ephemeris data (hot start). It is however noted that example embodiments may be generally applied to any number of positioning start states with different initial positioning information available. The hot and warm start states are therefore used merely as examples of different positioning start states.

The positioning capability information may comprise indications of time periods, e.g. first and second time periods, associated with determining a position of the UE 110 when the UE 110 has different initial positioning data available. For example, the positioning capability information may include an indication of a first time period associated with the warm start state and a second time period associated with the hot start state. The UE 110 may transmit an indication of these time periods to the network node, for example as the positioning capability information.

Regarding the UE capability reporting, the UE 110 may report a maximum time the UE 110 needs to do both hot and warm starts. To simplify the signaling and network operation, a sequence of values may be defined. The UE 110 may then select the nearest value, which exceeds its internal hot/warm start time. For example, if the sequence of values comprises $T_{hot\_start}=[0.5\ 1\ 1.5\ 2]$ seconds, and the UE 110 needs 1.3 seconds for a hot start, it may report the hot start capability of 1.5 seconds to the network node. The UE 110 may also report a maximum time between GNSS fixes (location updates) that enables the UE 110 to still use a hot start while meeting the accuracy requirements necessary for at least initial access in NTN.

At operation 302, the network node may determine whether there is downlink data for transmission to UE 110. If there is currently no data for UE 110, the network node may wait until downlink data is received for transmission to UE 110 (cf. "No" loop of the procedure). If there is data for the UE 110, the network node may determine that the UE 110 needs to be paged. In response to determining that there is downlink data to UE 110, the network node may proceed to operation 303.

At operation 303, the network node may determine a GNSS_gap parameter, which represents an example of a positioning time gap. The GNSS_gap may be specific to each UE. The GNSS_gap may be determined based on the positioning capability information of the UE 110. The GNSS_gap may be used to accommodate sufficient time between a wake-up signal or a paging message and a subsequent paging occasion to facilitate GNSS start at the UE 110. In general, the GNSS_gap may be provided after transmission of a first signal, which may comprise for example a wake-up signal or a paging message. The network device may refrain from transmission of a second signal for the duration of the GNSS_gap from the transmission of the first signal. The second signal may comprise a paging message. If the first signal comprises a paging message, the latter paging message, corresponding to the second signal, may be referred to as a second paging message.

According to an example embodiment, the network node may determine the GNSS_gap based on the first or second time period, e.g. the warm start delay or the hot start delay. For example, if the network node is not aware of the start state of the UE 110, the network node may determine the positioning time gap based on the time period associated with the warm state, in order to guarantee that there is enough time for the UE 110 to determine its location before transmission of the (second) paging message, even if no ephemeris data were not available at the UE 110. The network node may for example configure (e.g. by broadcasting) a gap between WUS and PO, which accommodates the longest warm start delay. When the UE 110 detects the WUS, the UE 110 may determine whether it needs to perform hot or warm start, and then determine a time for initiating the GNSS start to make sure the process is finished prior to the start of the PO, which may be determined by the reception time of the WUS plus the network configured GNSS_gap. This method is useful if the network is not aware of the GNSS states of individual UEs.

However, if the network node is aware of the start state of the UE 110, or it is able to determine it, the network node may select the time period associated with the start state of the UE 110 as basis for determining the GNSS_gap. For example, the network node may select the GNSS_gap to be equal to the first time period, or determine the GNSS_gap based on adjusting the first time period, if the UE 110 is in the warm start state. And, the network node may select the GNSS_gap to be equal to the second time period, or determine the GNSS_gap based on adjusting the second time period, if the UE 110 is in the hot start state.

According to an example embodiment, the network node may determine which time period indicated in the positioning capability information to use for determining the GNSS_gap based on an arrival time of a previous (e.g. latest) location update from the UE 110.

As noted above, the validity time for almanac, ephemeris, and past location estimate may be different. Therefore, the network node may estimate whether a hot or a warm GNSS start is needed based on the duration since the last time the UE 110 provided a location update. As the UE 110 has the same understanding of when it used GNSS the last time, no extra signaling is needed between the network node and the UE 110.

For example, if a previous location update of the UE 110 has been received within the update interval of the almanac data and not within the update interval of the ephemeris data, the network node may determine to use the first time period as basis for determining the GNSS_gap for UE 110 (cf. warm start). If the previous location update of the UE 110 has been received within the update interval of the ephemeris data, the network node may determine to use the second time period as basis for determining the GNSS_gap for UE 110 (cf. hot start). As discussed above, the GNSS_gap may be selected to be equal to the first or second time period, or determined by adjusting the first or second time period, for example by scaling it with a location dependent scaling factor or adding a cell reselection time, as will be further described below. The GNSS_gap time may be therefore determined based on the last time the UE 110 was active, since that was the last time the network is aware that the UE 110 had its location and almanac/ephemeris data updated.

According to an example embodiment, the GNSS_gap may be dependent on the location of the UE 110, since the warm and hot start times may be different in different environments and/or locations on the earth. Location-dependent GNSS_gap may be applied based on information collected during previous paging attempt(s), possibly associated with different UEs, or testing the GNSS start capability in different locations. If changing the location changes the GNSS gap time, the network may determine a location-dependent adjustment for the GNSS_gap. The network node may further inform the UE 110 about this adjustment.

The location-dependent adjustment may be done for example by applying a scaling factor to the positioning capabilities of the UE 110. The network node may adjust the GNSS_gap by scaling the GNSS_gap by a scaling factor. The scaling factor may be location-dependent. The network node may collect, maintain, and/or update a list of scaling factors applicable at different locations or geographical areas. The network node may for example select the scaling factor from the list of scaling factors associated with different locations based on the previous location of the UE 110.

The network node may further transmit an indication of the use of the scaling factor to the UE 110. The indication may be for example provided through broadcast. The location-dependent GNSS_gap may be for example indicated by a notification from the network to the UE 110.

It is noted that application of the scaling factor may be implemented either by scaling the GNSS_gap and informing the UE 110 about the scaled GNSS_gap, or not scaling the GNSS_gap at the network node, but indicating a scaling factor to be applied at the UE 110. In the latter case the UE 110 may apply the received scaling factor to the non-scaled GNSS_gap.

According to an example embodiment, the GNSS_gap may be also dependent on the likely cell or satellite which is determined or predicted to provide coverage to the UE 110 after application of the GNSS_gap, for example in case of a LEO system, where satellites move quickly. The network node may determine that the UE 110 is expected to perform cell reselection to another cell before an intended transmission time of the (second) paging message. The network node may for example determine that the hot and/or warm start capability times, which may be signaled by the UE 110, and the next possible WUS transmission occasion leads to the next possible paging occasion occurring when the current cell (or satellite) no longer provides coverage to the UE 110. Therefore, the UE 110 may also need time to perform cell (or satellite) reselection and potentially also cell search. In this case the network may provide a paging period that takes into account the additional time needed for cell reselection and/or cell search. This additional time may enable the UE 110 to reselect a new cell. In case of NTN a single paging area may cover a fixed area on the earth.

The network node may therefore determine that the UE 110 needs to perform cell (or satellite) reselection to another cell before an intended transmission time of the (second) paging message. The intended transmission time of the (second) paging message may include a time determined based on a non-adjusted GNSS_gap or a GNSS_gap adjusted based the previous location of the UE 110. This GNSS_gap (resulting in the intended transmission time) may be then adjusted based on a cell reselection time. For example, the network node may add a predetermined cell (or satellite) reselection time to the GNSS_gap determined earlier. The cell reselection time may include also time for cell search. Alternatively, the GNSS_gap may be adjusted by adding to the GNSS_gap a cell reselection time and a cell search time separately.

At operation 304, the network node may determine whether WUS is used or not. If WUS is in use, the network node may proceed to operation 305 to send a WUS. If WUS is not in use, the network node may proceed to operation 306 to send paging to the UE 110. It is however noted that in some example embodiments the network node may be preconfigured to send either WUS (operation 305) or paging (operation 306) and therefore the determination of whether WUS is used may be optional.

At operation 305, the network node may send a WUS at time to (first time). The WUS may include an indication, for example a single-bit indication (flag), to inform the UE 110 of whether the GNSS_gap is used or not. Alternatively, or additionally, the WUS may include an indication of the value (duration) of the GNSS_gap. The WUS may comprise an indication of use of the first time period or the second time period as the GNSS_gap. This reduces the amount of signaling, since the duration of the relevant time period does not need to be signaled. The indication of the use of the GNSS_gap and/or the value of the GNSS_gap may be alternatively included in any other control signal or control message. Using WUS enables false alarm paging rate of the UE 110 to be decreased, because the UE 110 may not monitor every PO and instead monitor just PO(s) indicated by the WUS.

GNSS may be used for synchronization prior to uplink transmissions in NTN. The UE 110 may maintain downlink timing synchronization by receiving the primary and secondary synchronization signals, which may be broadcasted periodically by the network node. Therefore, the UE 110 may be capable of receiving the WUS without using the GNSS.

At operation 306, as an alternative to operation 305, the network node may send a paging message to the UE 110 at time $t_0$. Instead of using WUS, or signaling the GNSS_gap or a targeted PO via the WUS, the network may calculate the potential gap time caused by the GNSS start process and provide the GNSS_gap between the paging message and a second (subsequent) paging message. The paging message may be transmitted at a particular paging occasion and the second paging message may be transmitted at a second (subsequent) paging occasion.

At operation 306 the network may page the UE 110 in a first possible paging opportunity. When the UE 110 is paged, the UE 110 may need the GNSS_gap, similar to after the WUS, to complete the GNSS start before attempting to connect to the network by random access. The network node may therefore store the determined GNSS_gap. The network node may refrain from transmitting further paging messages during the GNSS_gap. This enables the network node to avoid unnecessary resending of the paging message, while the UE 110 is in the GNSS start process. The network node may resend the paging message after expiry of the GNSS_gap, or the hot and/or warm start delay time periods. When operation 306 is used, the network node may not schedule a second paging, but can also expect a later answer (e.g. a later expected answer through RACH). Operation 307 may be therefore optional.

Expiry of the GNSS_gap may be determined for example based on a timer, which may be initiated at the time of transmission of the wake-up signal or the paging message, for example at the beginning or end of the relevant transmission. The timer may be for example initiated at the value of the GNSS_gap parameter and expiry of the GNSS_gap time may be determined, in response to detecting the value of the timer to have decreased to zero.

Even though operations 305 and 306 have been illustrated as options to each other in FIG. 3, according to an example embodiment the network node may transmit a WUS, a paging message, and a second paging message, in this order. The network node may refrain from transmitting further paging messages to the device until for the duration of the GNSS_gap from the transmission of the paging message. The GNSS_gap may be therefore provided between the paging message and the second paging massage, also in the case where the and second paging messages are preceded by a WUS.

At operation 307, the network node may send a (second) paging message to the UE 110 at time $t_0$+GNSS_gap (second time). The network node may therefore refrain from transmitting paging messages to the UE 110 for the duration of the positioning time gap, counted from the transmission of the WUS (in case of operation 305) or the paging message (in case of operation 306).

Note that the GNSS_gap may be equal to one of the time periods included in the positioning capability information or an adjusted version of it, as described above. Based on the determined GNSS_gap, the network node may determine a paging occasion for transmission of a paging message. The network node may therefore transmit, or schedule for transmission, a (second) paging message to the UE 110 at the second time. The GNSS_gap may be provided between the first time ($t_0$) and the second time ($t_0$+GNSS_gap).

Application of the GNSS_gap as described above may result for example in the (second) paging occasion occurring after the WUS time plus the hot start delay, or the (second) paging occasion occurring after the WUS time plus the warm start delay. Alternatively, the scaling factor may be applied to hot and warm start delays to take into account location dependency. As a fall back solution, for example when the network is not aware of the start state of the UE 110, the network node may transmit paging both after the hot start delay and the warm start delay. It is noted that in all embodiments the network node may optionally refrain from transmission of the second signal for longer than the duration of the GNSS_gap, for example because of an allocation a potential paging message occurring after the GNSS_gap to the earliest possible paging occasion occurring after the GNSS_gap.

At operation 308, the network node may receive a response to the (second) paging message from the UE 110. The response may comprise a random access signal, for example a random access preamble. The random access signal may be transmitted in order to initiate a connection with the network node. The response may include an indication of the location of the UE 110. A connection may be then established between the network node and the UE 110 based on the information of the location of the UE 110.

Figure 4:
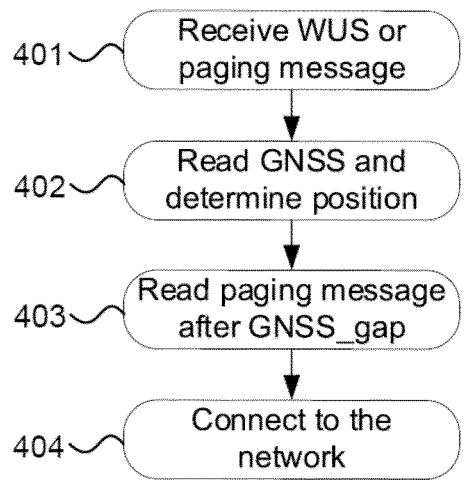
FIG. 4 illustrates an example of a UE side flow chart for configuring and applying a GNSS gap, according to an example embodiment.

FIG. 4 illustrates an example of a UE side flow chart for configuring and applying a GNSS gap, according to an example embodiment. The procedure of FIG. 4 may be applied at a device, for example UE 110. Even though example embodiments have been described in context of GNSS, it is noted that the example embodiments may be applied to any suitable positioning system, as described above.

Initially, the UE 110 may transmit its positioning capability information to a network node. The positioning capability information may comprise indications of time periods associated with determining location of the UE 110 at various GNSS start states, as described above.

At operation 401, the UE 110 may receive a WUS or a paging message, which are provided as examples of a first signal, as described above. The WUS or the paging message may be configured as described with reference to FIG. 3. The WUS or the paging message may be received at time to (first time). For simplicity the propagation delay between transmission of the WUS or paging by the network node and their reception at the UE 110 is omitted in this example. In some embodiments, the UE 110 may receive a WUS prior to reception of a paging message and the GNSS_gap may be provided after the paging message.

The UE 110 may further receive a scaling factor for the GNSS_gap. The scaling factor may be associated with a previous location of the UE 110. The WUS may further comprise at least one of: an indication of the use of GNSS_gap, an indication of the duration of the GNSS_gap, or use of the first or second time period as the GNSS_gap. Alternatively, this information may be received in any other control signal or control message. Based on this indication, the UE 110 may refrain from monitoring paging occasions occurring during the GNSS_gap, which reduces power consumption.

At operation 402, the UE 110 may read GNSS and determine position of the UE 110. Initially the UE 110 UE may be in an RRC Idle/Inactive mode. Furthermore, the UE 110 may have turned off its GNSS device to save power, or in general configured the GNSS device to be in a low-power state. The UE 100 may therefore first activate, for example turn on, its GNSS device. The position of the UE 110 may be then determined, for example based on GNSS signals received by the activated GNSS device from multiple satellites. The GNSS device may be activated in response to receiving the WUS or the first paging message at operation 401. This enables the UE 110 to have its position ready when the (second) paging message arrives, which allows the UE 110 to access the NTN network using the GNSS, for example for precompensation and/or location update. Precompensation enables the UE 110 to ensure its transmission is time-frequency aligned with the network, for example such that it does not generate too much interference in the receiver. For example, by using UE location and satellite ephemeris (=location) the UE 110 can calculate the radio propagation delay and then determine the timing advance before transmission. The UE 110 may be also be requested, e.g. by the network node, to provide its location to the network, for example for legal reasons. Therefore, the UE 110 may determine a timing advance for subsequent communication with the network node based on the determined position of the UE 110. Furthermore, the UE 110 may transmit an indication of the determined location to the network node.

At operation 403, the UE 110 may read a (second) paging message after the GNSS_gap. The (second) paging message may be received at time $t_0$+GNSS_gap (second time). As discussed above, the GNSS_gap may be provided after transmission of the wake-up signal or the paging message. The GNSS_gap may be based on positioning capability information of the UE 110. The positioning capability information may comprise an indication of a first time period for determining a position of the apparatus with first initial positioning data (cf. data available at a warm start) and an indication of a second time period for determining the position of the apparatus with second initial positioning data (cf. data available at a hot start).

In order to receive the (second) paging message, the UE 110 may monitor at least one PO occurring after the GNSS_gap for reception of the (second) paging message. If a scaling factor is received, for example in the WUS, the UE 110 may scale the GNSS_gap, or the first or second time period, by the scaling factor. The UE 110 may then monitor at least one PO occurring after the GNSS_gap scaled with the scaling factor for reception of the (second) paging message. According to an example embodiment, the UE 110 may scale the GNSS_gap with the scaling factor provided by the network node before initiating the monitoring of the corresponding PO(s).

At operation 404, the UE 110 may connect to the network. For example, the UE 110 may transmit a random access signal, for example a random access preamble to the network node. In general, the UE 110 may transmit response to the (second) paging message to the network node. The response may comprise an indication of the location of the UE 110 determined at operation 402.

Figure 5:
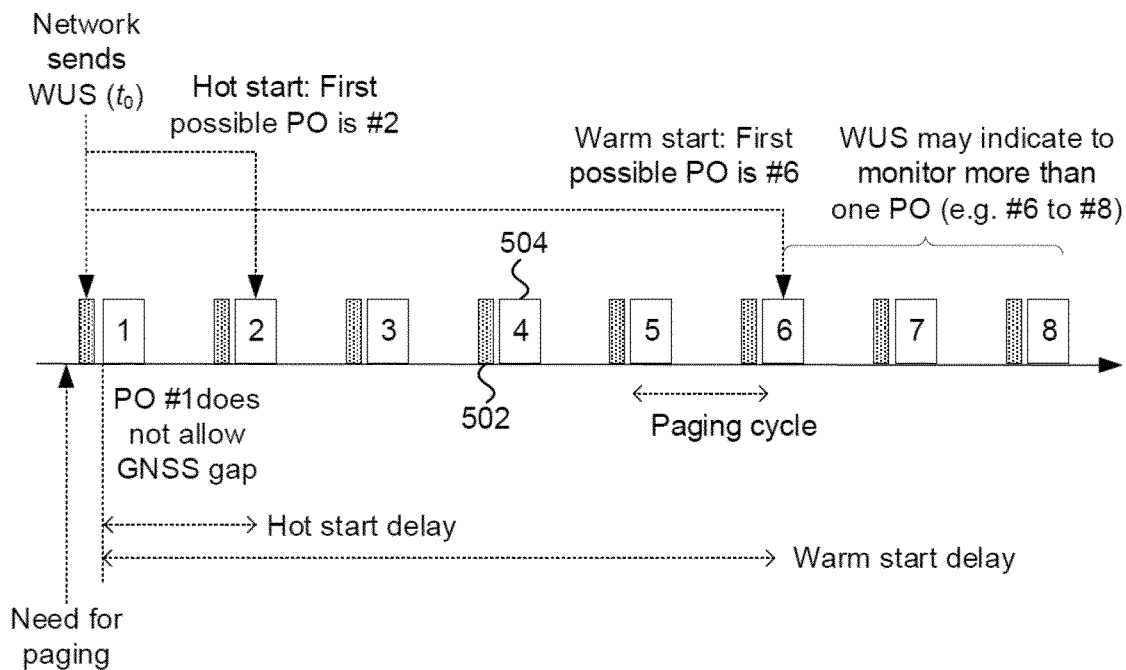
FIG. 5 illustrates an example of wake-up signals, paging occasions, and GNSS start delays, according to an example embodiment.

FIG. 5 illustrates an example of wake-up signals, paging occasions, and GNSS start delays, according to an example embodiment. Wake-up signals 502 have been illustrated with dotted shading and paging occasions 504 (#1 to #8) have been illustrated with white colour.

The network node may initially determine a need for paging, for example as described with reference to operation 302. The network node may then transmit a WUS at time $t_0$. Once the network node has determined the GNSS gap time, for example as in operation 303, it may calculate the relation between the WUS ($t_0$) and potential paging occasion(s). The paging occasions may be scheduled based on a paging cycle, which may entail the POs occurring with a certain periodicity, for example at intervals of 1.28 s. Since the GNSS hot/warm start delays may be expressed as absolute time values, the network node may determine the first one or more POs occurring after the GNSS_gap, based on the paging cycle. The network node may determine to page the UE 110 at a first paging occasion occurring after the WUS time ($t_0$) plus the GNSS_gap time, which reflects either the hot or warm start delay.

In this example, the first paging occasion (PO #1) does not allow the GNSS_gap to be provided between the WUS time ($t_0$) and the PO #1. In case of a hot start, the PO #2 may be the first PO that allows to provide the GNSS_gap. Therefore, the network node may determine to page the UE 110 at PO #2, if the network has determined that the UE 110 is capable of performing a hot start.

In case of a warm start, the PO #6 may be the first PO that allows to provide the GNSS_gap. Therefore, the network node may determine to page the UE 110 at PO #6, if the network has determined that the UE 110 is capable of performing a warm start and not able to perform a hot start.

If the network node is not sure whether the UE 110 is capable of performing a hot start or a warm start, the network node may transmit paging both in PO #2 and PO #6. Hence, the network node may first page the UE 110 in PO #2. If the UE 110 does not react to the paging, for example by transmitting a paging response, the network node may repeat the paging in PO #6.

According to an example embodiment, the network node may transmit the (second) paging message in multiple consecutive paging occasions occurring after the warm start delay, as illustrated in FIG. 5. In this example, the WUS may indicate a plurality of POs (e.g. #6 to #8) to be monitored by the UE 110. Similarly, the network node may request the UE 110 to monitor a plurality of POs occurring after the hot start delay (not illustrated in FIG. 5). The plurality of POs may comprise consecutive POs.

Alternatively, the WUS may indicate the GNSS_gap time used by the network node or directly the POs targeted by the network node. For example, the WUS may comprise an identifier, for example a subframe number, of the paging occasions to be monitored by the UE 110.

The UE 110 may therefore monitor one or a plurality of paging occasions for reception of the (second) paging message. The paging occasion(s) may correspond to the GNSS_gap. For example, the monitored paging occasion(s) may be located after the GNSS_gap time counted from the WUS transmitted at time $t_0$.

Figure 6:
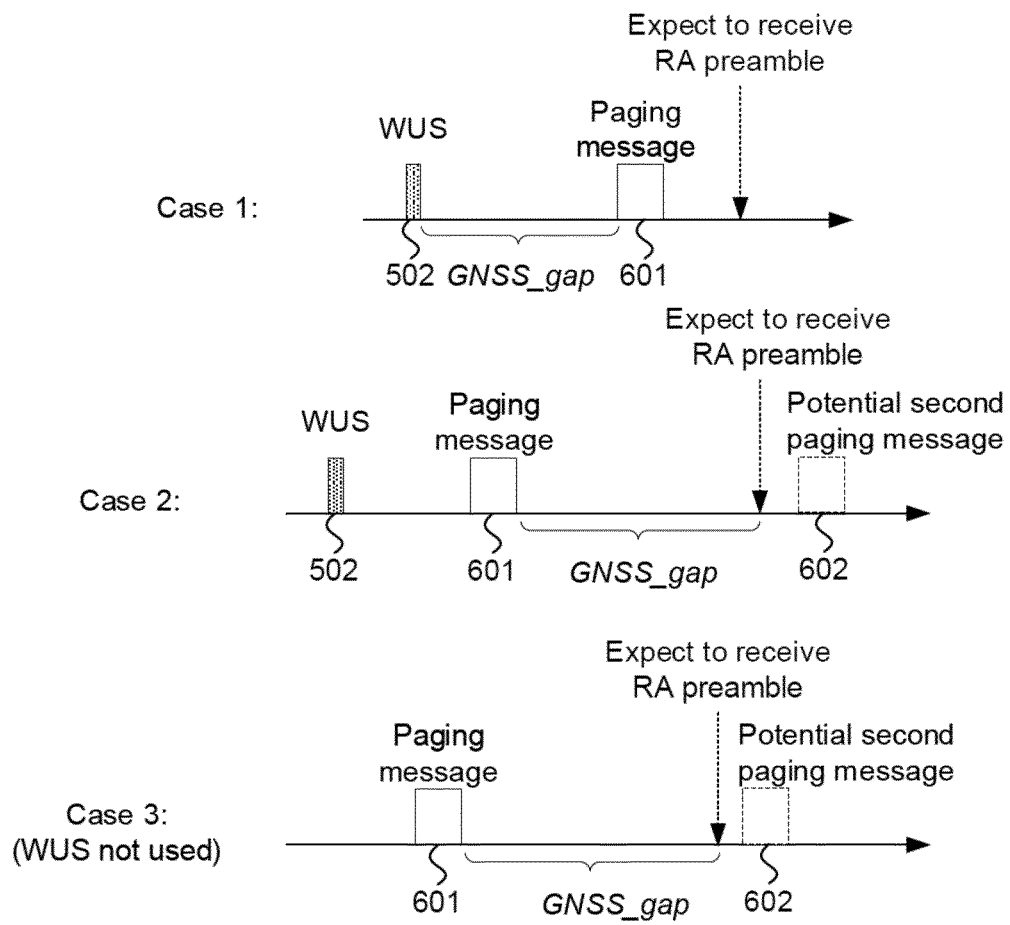
FIG. 6 illustrates examples of wake-up signals and paging messages with a GNSS gap, according to an example embodiment.

FIG. 6 illustrates examples of wake-up signals and paging messages with a GNSS gap, according to an example embodiment. In Case 1, the GNSS_gap may be provided between transmissions of the WUS 502 and the paging message 601. The network node may expect to receive a random access preamble after transmission of the paging message 601. The paging message 601 may be transmitted at the earliest paging occasion occurring after transmission of the WUS 502. The UE 110 may transmit the random access preamble in response to receiving the paging message 601.

In Case 2, the network node may transmit the WUS 502, the paging message 601, and potentially a second paging message 602. The GNSS_gap may be provided after the paging message 601. The second paging message 602 may be scheduled for transmission at a paging occasion occurring after expiry of the GNSS_gap. The second paging message 602 may be transmitted if the network node does not receive the RA preamble from the UE 110 after expiry of the GNSS_gap. The network node may however determine not to transmit the second paging message 602, if a random access preamble is received from the UE 110 before the scheduled transmission of the second paging message 602. The UE 110 may transmit the random access preamble whenever it has determined its position. The random access preamble may be therefore transmitted during the GNSS_gap.

In Case 3, the network node may not transmit a WUS. The network node may transmit the paging message 601 directly and the GNSS_gap may be provided after the paging message 601. The paging message 601 may be referred to as a first paging message. Similar to Case 2, the second paging message 602 may or may not be transmitted depending on whether the UE 110 transmits a random access preamble before the scheduled transmission of the second paging message 602. Also in this case the UE 110 may transmit the random access preamble in response to determining its position, possibly within the GNSS_gap.

In all above cases, the paging messages 601 and/or 602 may contain an identifier of the UE 110 (UE ID). However, in case of more than one paging messages, the paging messages may not be exactly identical, because some other UEs may paged in the first paging occasion, but not in the second paging occasion, or vice versa. Transmission of a paging message to UE 110 may comprise transmission of a paging message, which comprises the UE ID of the UE 110, for example in a list of UE IDs. As discussed above, the network node may transmit the second paging message 602 only if the network node does not receive the random access preamble from the device at the expected time. A benefit provided by the example embodiments is therefore that retransmission of the paging message may be avoided until the GNSS_gap has expired. Otherwise, the network may sooner assume that the random access/paging message from the UE 110 failed and unsuccessfully retransmit the paging message, since the UE 110 is still in the GNSS process.

By accounting for the hot/warm start GNSS delay (based on the UE capability signaling) the network may page the UE 110 at the right point of time. If the network is unaware of the delay, it may send the paging too early after the WUS, or repeat the paging, because the UE 110 does not react to the paging in time. This may occur if the UE 110 did receive the first paging, but is still in the process of GNSS start. Both of the above may cause unnecessary signaling and network energy consumption, which may be avoided by the example embodiments of the present disclosure. Since the UE 110 knows the network is aware of its GNSS delays, the UE 110 may avoid running the GNSS at random time instances and/or prior to every paging occasion, and instead activate the GNSS only when it is actually paged. This reduces power consumption at the UE 110 and thereby enables longer battery life time.

Figure 7:
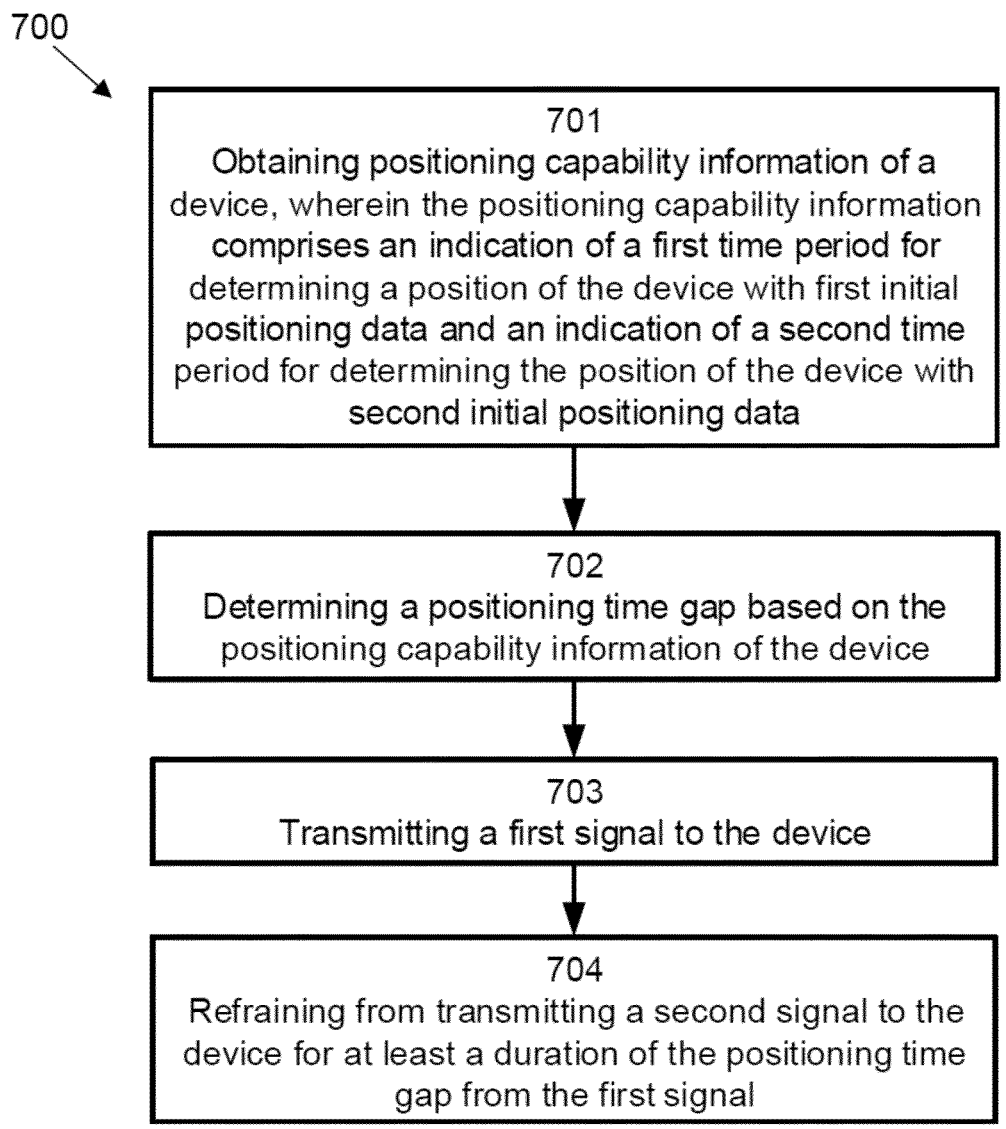
FIG. 7 illustrates an example of a method for paging, according to an example embodiment.

FIG. 7 illustrates an example of a method 700 for paging, according to an example embodiment.

At 701, the method may comprise obtaining positioning capability information of a device, wherein the positioning capability information comprises an indication of a first time period for determining a position of the device with first initial positioning data and an indication of a second time period for determining the position of the device with second initial positioning data.

At 702, the method may comprise determining a positioning time gap based on the positioning capability information of the device.

At 703, the method may comprise transmitting a first signal to the device.

At 704, the method may comprise refraining from transmitting a second signal to the device for at least a duration of the positioning time gap from the first signal.

Figure 8:
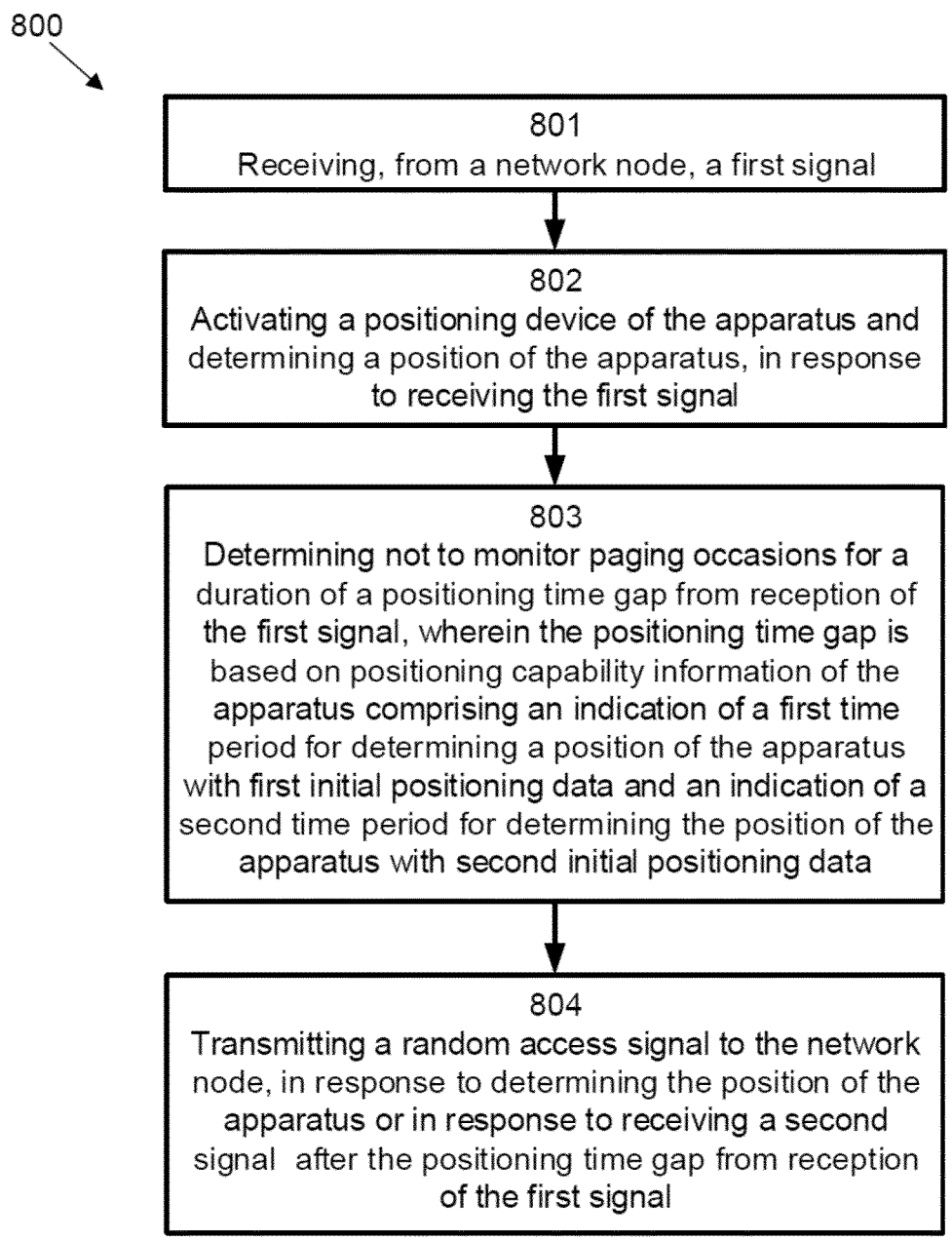
FIG. 8 illustrates an example of a method for receiving paging, according to an example embodiment.

FIG. 8 illustrates an example of a method 800 for receiving paging, according to an example embodiment.

At 801, the method may comprise receiving, from a network node, a first signal.

At 802, the method may comprise activating a positioning device of the apparatus and determining a position of the apparatus, in response to receiving the first signal.

At 803, the method may comprise determining not to monitor paging occasions for a duration of a positioning time gap from reception of the first signal, wherein the positioning time gap is based on positioning capability information of the apparatus comprising an indication of a first time period for determining a position of the apparatus with first initial positioning data and an indication of a second time period for determining the position of the apparatus with second initial positioning data.

At 804, the method may comprise transmitting a random access signal to the network node, in response to determining the position of the apparatus or in response to receiving a second signal after the positioning time gap from reception of the first signal.

Further features of the methods directly result from the functionalities and parameters of the UE 110, the satellite 120, or in general the apparatus 200, as described in the appended claims and throughout the specification, and are therefore not repeated here. Different variations of the methods may be also applied, as described in connection with the various example embodiments.

An apparatus may be configured to perform or cause performance of any aspect of the method(s) described herein. Further, a computer program or a computer program product may comprise instructions for causing, when executed, an apparatus to perform any aspect of the method(s) described herein. Further, an apparatus may comprise means for performing any aspect of the method(s) described herein. According to an example embodiment, the means comprises at least one processor, and at least one memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. An apparatus, comprising:
   at least one processor;
   and at least one memory including computer program code, the at least one memory and the computer program code configured to, with the at least one processor, cause the apparatus at least to:
   obtain positioning capability information of a device, wherein the positioning capability information comprises an indication of a first time period for determining a position of the device with first initial positioning data and an indication of a second time period for determining the position of the device with second initial positioning data, wherein the first initial positioning data comprises at least almanac data of a plurality of satellites and not ephemeris data, and wherein the second initial positioning data comprises at least the almanac data of the plurality of satellites and the ephemeris data of at least one of the plurality of satellites;

determine a positioning time gap based on the positioning capability information of the device, and wherein determining the position time gap further comprises:

when a previous location update of the device has been received within an update interval of the almanac data and not within an update interval of the ephemeris data, using the first time period as basis for determining the positioning time gap; and when the previous location update of the device has been received within the update interval of the ephemeris data determine to use the second time period as basis for determining the positioning time gap;

transmit a first signal to the device;

refrain from transmitting a second signal to the device for at least a duration of the positioning time gap from the first signal, wherein the first signal comprises a paging message and the second signal comprises a second paging message; and determine that the device is expected to perform cell reselection to another cell before an intended transmission time of the second paging message; and adjust the positioning time gap based on a cell reselection time.

2. The apparatus according to claim 1, wherein the apparatus is further caused to: determine not to transmit the second signal, in response to receiving a random access signal from the device.

3. The apparatus according to claim 2, wherein the first signal comprises a wake-up signal and the second signal comprises a paging message.

4. The apparatus according to claim 3, wherein the apparatus is further caused to: scale the positioning time gap by a scaling factor associated with a previous location of the device; and transmit an indication of the scaling factor to the device.

* * * * *